J. H. GRAVELL.
ELECTRIC WELDING APPARATUS.
APPLICATION FILED NOV. 23, 1918.

1,308,778.

Patented July 8, 1919.

INVENTOR
James H. Gravell
BY
Townsend & Decker
ATTORNEYS

UNITED STATES PATENT OFFICE.

JAMES H. GRAVELL, OF BROOKLYN, NEW YORK, ASSIGNOR TO THOMSON ELECTRIC WELDING COMPANY, OF LYNN, MASSACHUSETTS, A CORPORATION OF MASSACHUSETTS.

ELECTRIC WELDING APPARATUS.

1,308,778.      Specification of Letters Patent.      Patented July 8, 1919.

Application filed November 23, 1918. Serial No. 263,796.

*To all whom it may concern:*

Be it known that I, JAMES H. GRAVELL, a citizen of the United States, and a resident of Brooklyn, in the county of Kings and State of New York, have invented certain new and useful Improvements in Electric Welding Apparatus, of which the following is a specification.

My present invention relates to electric resistance welding apparatus and has for its object to provide means for insuring a uniform work-contacting surface for the electrode.

Although the invention can be applied to many forms of resistance welding it is especially useful in the case of continuous lap seam welding wherein the welding is done by means of a single roller and a mandrel or with two coöperating rollers.

It is well known in the art of seam welding especially in cases where the work is overlapped and heated directly beneath the electrode or welding roller, that it is very difficult to secure satisfactory welding unless the roller is kept clean by continuous grinding or polishing due to the fact that small particles of metal or dirt attach themselves to the welding roller. These particles when attached to the roller cause it to bear unevenly on the work giving unequal heating with the result that the seam may be properly welded at some places and not welded at all at other places.

It is quite evident that a particle once attached to the roller will interfere with the welding on every rotation of the roller and uness some grinding or dressing device, continuously operating on the roller periphery, is used it is almost impossible to detect the particle until after it has produced its injurious effect.

According to this invention, the roller is continuously provided with a new work-engaging surface in the form of a strip of good conducting material which is fed from a reel on which it is stored.

The invention consists in the electric welding apparatus hereinafter more particularly described and then specified in the claims.

In the accompanying drawings, Figure 1 is a side elevation diagrammatically illustrating my invention as applied to lap seam welding.

Figure 1:
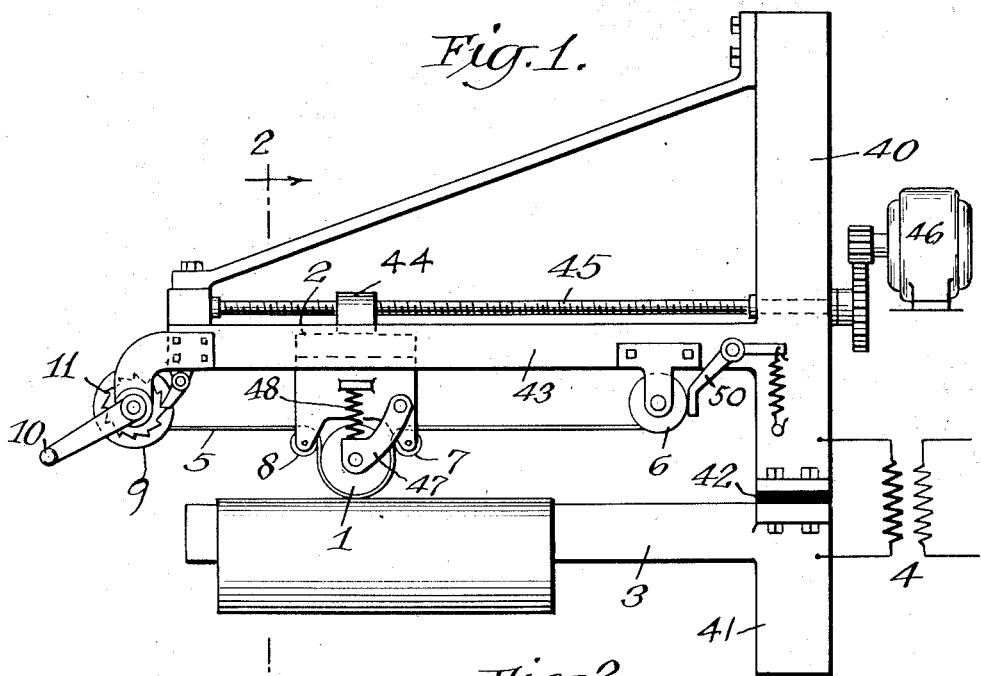
Figure 2:
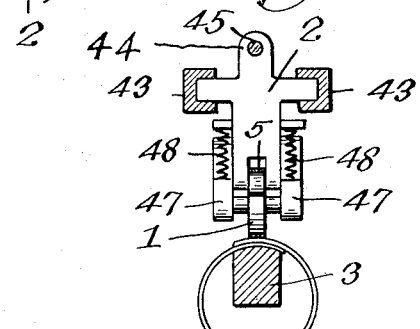
Fig. 2 is a transverse section on the line 2—2.

1 indicates a welding or pressure roller suitably mounted to rotate in a carriage 2. 3 indicates the horn or mandrel upon which the work comprising the overlapped seam 2 is supported. The horn 3 and preferably the roller 1 form part of any suitable type of electric seam welding apparatus, the general organization of which is now well known in the art. Usually the horn and roller are connected to opposite terminals of the secondary of a transformer 4. As diagrammatically shown in the drawings, in the apparatus illustrated the opposite ends of the transformer secondary are respectively connected to a part 40 and a part 41 of the frame work of the apparatus, the two parts being insulated from each other at 42. The horn 3 projects from the part 41 and a two-part track or support 43 projects from the part 40. The track 43 supports and guides the carriage 2. 44 indicates a boss projecting upward from the carriage 2 and which forms a nut for a feed screw 45. The feed screw is rotated by any suitable means as the motor 46 and due to its rotation causes the carriage 2 with its roller 1 to travel the length of the work. The roller 1 is preferably yieldingly mounted on the carriage 2, it being supported in the ends of pivoted arms 47 backed up by springs 48 so that the roller is pressed on the work. In the form shown the mandrel or horn 3 remains stationary although it will be understood that if desired the roller may be retained in one position and the mandrel with the work fed along relative thereto. Also if desired the horn may be replaced by a coöperating roller, all said modifications being well known at the present time in the seam welding art.

5 indicates a thin strip of good conducting material such as copper or bronze and of considerable length. The strip is attached at one end to a storage reel 6 mounted on the track 43. The strip is wound on the reel 6 and passes over guide pulleys or rolls 7, 8 mounted on the carriage 2 and under the welding roller 1. The other end of the strip is attached to a wind-up reel 9 mounted in a fixed position on the outer end of the track 43.

The portion of the strip 5 at the point of contact with the work forms the work-engaging surface through which current and pressure is applied to the seam. It will be obvious that as the work and the reels 6 and 9 remain stationary and the carriage 2 with the welding roller 1 and guide rolls 7, 8 travels along the seam, a continuously new portion of the strip 5 is presented to the work by the roller 1. After the welding roller has traveled the length of the seam, an entirely new length of the strip 5, to form a new work-contacting surface for the roller 1, is presented by winding up the used portion of the strip on the reel 9 by means of handle 10 or otherwise, the strip unwinding from the reel 6.

In case the mandrel 3 is replaced by a roller to coöperate with the roller 1, a work-engaging strip similar to the strip 5 may or may not be employed as desired.

As the metal strip 5 can be made very thin a strip of great length can be provided by a relatively small reel and the use of a new section of the strip can be repeated many times before a single reel is exhausted. After one reel is exhausted it is replaced by another. The first reel can then be inspected and the injured portions removed or redressed before it is again used.

It is found in practice that as the strip is exceedingly thin (metal about .005 inches thick may be used) that it does not get excessively hot as its heat is immediately given up to the massive welding roller with which it is in contact and this roller is usually in the art cooled by water circulation.

The reel 9 is provided with a ratchet device 11 to prevent unwinding and the reel 6 is provided with a tension device 50 to maintain the tension of the strip 5.

Figure 3:
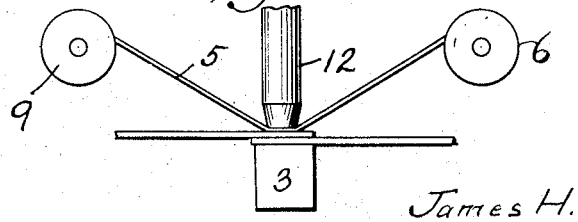
Fig. 3 illustrates the application of the invention to spot welding.

In Fig. 3 the invention is shown as applied for use in spot welding. In this case the current supplying strip is provided with current in any desired way and welds may be made by means of the pressure device in the form of a pin 12 until the part of the strip directly beneath it becomes damaged when the pressure device is again provided with a new work-contacting face by winding a small section of the strip on the reel 9.

The welding roller 1 may or may not be made of good conducting material as desired, it being sufficient that the strip 5 is made of good conducting material such as copper or bronze, the electric current being supplied thereto through its connection with the track 43 as shown or otherwise.

Suitable switching means are also provided for switching the current on and off at the beginning and end of the stroke of the carriage 2 respectively. This mechanism is well known in the art and is omitted from the drawings for clearness as it forms no part of the present invention.

What I claim as my invention is:

1. In an electric welding apparatus, the combination of a welding electrode, a reel and a strip of conducting material wound on said reel and adapted to form a work-contacting surface for said electrode.

2. In an electric welding apparatus, the combination of a welding electrode, a reel and a strip of conducting material wound on said reel and adapted to form a work-contacting surface progressively engaged by said electrode.

3. In an electric welding apparatus, the combination of a pressure device, a storage reel, a strip of conducting material wound on said reel and adapted to form a work-contacting surface for said pressure device and a wind-up reel for the previously used portions of said strip.

4. In an electric seam welding apparatus, the combination with a roller, a fixed storage reel, a fixed wind-up reel and a strip of good conducting material secured at opposite ends to said reels and adapted to be progressively engaged by said roller electrode.

5. In an electric seam welding apparatus, the combination with a roller mounted on a carriage, guide rolls on said carriage, fixed storage and wind-up reels and a strip of conducting material having its opposite ends secured to said reels and passing around said guide rolls and under the electrode roller to form a work-contacting surface therefor.

Signed at New York, in the county of New York and State of New York, this 19th day of November A. D. 1918.

JAMES H. GRAVELL.

Witnesses:
C. F. TISCHNER,
IRENE LEFKOWITZ.